(12) United States Patent
Mahaffey et al.

(10) Patent No.: US 8,826,441 B2
(45) Date of Patent: *Sep. 2, 2014

(54) EVENT-BASED SECURITY STATE ASSESSMENT AND DISPLAY FOR MOBILE DEVICES

(71) Applicant: Lookout, Inc., San Francisco, CA (US)

(72) Inventors: Kevin Mahaffey, San Francisco, CA (US); John G. Hering, San Francisco, CA (US); James Burgess, San Francisco, CA (US)

(73) Assignee: Lookout, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/790,402

(22) Filed: Mar. 8, 2013

(65) Prior Publication Data
US 2013/0191921 A1    Jul. 25, 2013

Related U.S. Application Data

(63) Continuation of application No. 13/267,731, filed on Oct. 6, 2011, now Pat. No. 8,510,843, which is a continuation of application No. 12/255,635, filed on Oct. 21, 2008, now Pat. No. 8,060,936.

(51) Int. Cl.
| | | |
|---|---|---|
| H04L 29/06 | (2006.01) | |
| G06F 17/00 | (2006.01) | |
| G06F 7/04 | (2006.01) | |
| G06F 15/16 | (2006.01) | |
| G06F 17/30 | (2006.01) | |
| G06F 21/00 | (2013.01) | |

(52) U.S. Cl.
USPC .......... 726/25; 726/1; 726/4; 726/22; 726/23; 713/188

(58) Field of Classification Search
None
See application file for complete search history.

(56) References Cited

U.S. PATENT DOCUMENTS

| | | |
|---|---|---|
| 3,416,032 A | 12/1968 | Jahns et al. |
| 4,553,257 A | 11/1985 | Mori et al. |
| 5,319,776 A | 6/1994 | Hile et al. |
| 5,574,775 A | 11/1996 | Miller, II et al. |

(Continued)

FOREIGN PATENT DOCUMENTS

| | | |
|---|---|---|
| GB | 2430588 | 3/2007 |
| WO | 2005101789 | 10/2005 |

(Continued)

OTHER PUBLICATIONS

Tedeschi, Bob, "In Choosing a New Phone, Online Research Goes Only So Far", The New York Times, Oct. 7, 2009; downloaded Jul. 13, 2013 from http://www.nytimes.com/2009/10/08/technology/personaltech/08smat.html?_r=0.

(Continued)

*Primary Examiner* — Shin-Hon Chen
(74) *Attorney, Agent, or Firm* — Dergosits & Noah LLP

(57) ABSTRACT

A security component on a mobile device collects data on security events, and determines an assessment of security state and severity levels using a database containing security threat data. A server receives security event data, performs an additional security state assessment, and transmits it for display on the mobile device or a webpage. Display of a security state assessment includes status indicator signals, and lists and charts of security events.

35 Claims, 9 Drawing Sheets

(56) References Cited

U.S. PATENT DOCUMENTS

| | | | |
|---|---|---|---|
| 5,715,518 | A | 2/1998 | Barrere et al. |
| 6,185,689 | B1 | 2/2001 | Todd et al. |
| 6,269,456 | B1 | 7/2001 | Hodges et al. |
| 6,272,353 | B1 | 8/2001 | Dicker et al. |
| 6,301,668 | B1 | 10/2001 | Gleichauf et al. |
| 6,453,345 | B2 | 9/2002 | Trcka et al. |
| 6,529,143 | B2 | 3/2003 | Mikkola et al. |
| 6,696,941 | B2 | 2/2004 | Baker |
| 6,792,543 | B2 | 9/2004 | Pak et al. |
| 6,892,225 | B1 | 5/2005 | Tu et al. |
| 6,907,530 | B2 | 6/2005 | Wang |
| 6,959,184 | B1 | 10/2005 | Byers et al. |
| 7,020,895 | B2 | 3/2006 | Albrecht |
| 7,023,383 | B2 | 4/2006 | Stilp et al. |
| 7,069,589 | B2 | 6/2006 | Schmall et al. |
| 7,096,368 | B2 | 8/2006 | Kouznetsov et al. |
| 7,123,933 | B2 | 10/2006 | Poor et al. |
| 7,127,455 | B2 | 10/2006 | Carson et al. |
| 7,159,237 | B2 | 1/2007 | Schneier et al. |
| 7,171,690 | B2 | 1/2007 | Kouznetsov et al. |
| 7,178,166 | B1 | 2/2007 | Taylor et al. |
| 7,181,252 | B2 | 2/2007 | Komsi |
| 7,210,168 | B2 | 4/2007 | Hursey et al. |
| 7,228,566 | B2 | 6/2007 | Caceres et al. |
| 7,236,598 | B2 | 6/2007 | Sheymov et al. |
| 7,237,264 | B1 | 6/2007 | Graham et al. |
| 7,266,810 | B2 | 9/2007 | Karkare et al. |
| 7,290,276 | B2 | 10/2007 | Ogata |
| 7,304,570 | B2 | 12/2007 | Thomas et al. |
| 7,305,245 | B2 | 12/2007 | Alizadeh-Shabdiz |
| 7,308,256 | B2 | 12/2007 | Morota et al. |
| 7,308,712 | B2 | 12/2007 | Banzhof |
| 7,325,249 | B2 | 1/2008 | Sutton et al. |
| 7,356,835 | B2 | 4/2008 | Gancarcik et al. |
| 7,376,969 | B1* | 5/2008 | Njemanze et al. ............. 726/22 |
| 7,386,297 | B2 | 6/2008 | An |
| 7,392,043 | B2 | 6/2008 | Kouznetsov et al. |
| 7,392,543 | B2 | 6/2008 | Szor |
| 7,397,424 | B2 | 7/2008 | Houri |
| 7,397,434 | B2 | 7/2008 | Mun et al. |
| 7,401,359 | B2 | 7/2008 | Gartside et al. |
| 7,403,762 | B2 | 7/2008 | Morgan et al. |
| 7,414,988 | B2 | 8/2008 | Jones et al. |
| 7,415,270 | B2 | 8/2008 | Wilhelmsson et al. |
| 7,433,694 | B2 | 10/2008 | Morgan et al. |
| 7,467,206 | B2 | 12/2008 | Moore et al. |
| 7,471,954 | B2 | 12/2008 | Brachet et al. |
| 7,472,422 | B1 | 12/2008 | Agbabian |
| 7,474,897 | B2 | 1/2009 | Morgan et al. |
| 7,493,127 | B2 | 2/2009 | Morgan et al. |
| 7,502,620 | B2 | 3/2009 | Morgan et al. |
| 7,515,578 | B2 | 4/2009 | Alizadeh-Shabdiz |
| 7,525,541 | B2 | 4/2009 | Chun et al. |
| 7,551,579 | B2 | 6/2009 | Alizadeh-Shabdiz |
| 7,551,929 | B2 | 6/2009 | Alizadeh-Shabdiz |
| 7,634,800 | B2 | 12/2009 | Ide et al. |
| 7,685,132 | B2 | 3/2010 | Hyman |
| 7,696,923 | B2 | 4/2010 | Houri |
| 7,768,963 | B2 | 8/2010 | Alizadeh-Shabdiz |
| 7,769,396 | B2 | 8/2010 | Alizadeh-Shabdiz et al. |
| 7,774,637 | B1 | 8/2010 | Beddoe et al. |
| 7,783,281 | B1 | 8/2010 | Cook et al. |
| 7,809,353 | B2 | 10/2010 | Brown et al. |
| 7,809,366 | B2 | 10/2010 | Rao et al. |
| 7,818,017 | B2 | 10/2010 | Alizadeh-Shabdiz et al. |
| 7,835,754 | B2 | 11/2010 | Alizadeh-Shabdiz et al. |
| 7,856,234 | B2 | 12/2010 | Alizadeh-Shabdiz et al. |
| 7,856,373 | B2 | 12/2010 | Ullah |
| 7,861,303 | B2 | 12/2010 | Kouznetsov et al. |
| 7,907,966 | B1 | 3/2011 | Mammen |
| 7,916,661 | B2 | 3/2011 | Alizadeh-Shabdiz et al. |
| 7,991,854 | B2 | 8/2011 | Bahl |
| 7,999,742 | B2 | 8/2011 | Alizadeh-Shabdiz et al. |
| 8,014,788 | B2 | 9/2011 | Alizadeh-Shabdiz et al. |
| 8,019,357 | B2 | 9/2011 | Alizadeh-Shabdiz et al. |
| 8,031,657 | B2 | 10/2011 | Jones et al. |
| 8,054,219 | B2 | 11/2011 | Alizadeh-Shabdiz |
| 8,087,082 | B2 | 12/2011 | Bloch et al. |
| 8,089,398 | B2 | 1/2012 | Alizadeh-Shabdiz |
| 8,089,399 | B2 | 1/2012 | Alizadeh-Shabdiz |
| 8,090,386 | B2 | 1/2012 | Alizadeh-Shabdiz |
| 8,108,555 | B2 | 1/2012 | Awadallah et al. |
| 8,121,617 | B1 | 2/2012 | LaGrotta et al. |
| 8,126,456 | B2 | 2/2012 | Lotter et al. |
| 8,127,358 | B1* | 2/2012 | Lee ................................. 726/24 |
| 8,135,395 | B2 | 3/2012 | Cassett et al. |
| 8,195,196 | B2 | 6/2012 | Haran et al. |
| 8,259,568 | B2 | 9/2012 | Laudermilch et al. |
| 8,261,351 | B1 | 9/2012 | Thornewell et al. |
| 8,266,288 | B2 | 9/2012 | Banerjee et al. |
| 8,266,324 | B2 | 9/2012 | Baratakke et al. |
| 8,346,860 | B2 | 1/2013 | Berg et al. |
| 8,356,080 | B2 | 1/2013 | Luna et al. |
| 8,364,785 | B2 | 1/2013 | Plamondon |
| 2001/0044339 | A1 | 11/2001 | Cordero et al. |
| 2002/0042886 | A1 | 4/2002 | Lahti et al. |
| 2002/0087483 | A1 | 7/2002 | Harif |
| 2002/0108058 | A1 | 8/2002 | Iwamura |
| 2002/0183060 | A1 | 12/2002 | Ko et al. |
| 2002/0191018 | A1 | 12/2002 | Broussard |
| 2003/0028803 | A1* | 2/2003 | Bunker et al. ................. 713/201 |
| 2003/0046134 | A1 | 3/2003 | Frolick et al. |
| 2003/0079145 | A1 | 4/2003 | Kouznetsov et al. |
| 2003/0115485 | A1 | 6/2003 | Milliken et al. |
| 2003/0120951 | A1 | 6/2003 | Gartside et al. |
| 2003/0131148 | A1 | 7/2003 | Kelley et al. |
| 2004/0022258 | A1 | 2/2004 | Tsukada et al. |
| 2004/0025042 | A1 | 2/2004 | Kouznetsov et al. |
| 2004/0133624 | A1 | 7/2004 | Park |
| 2004/0158741 | A1 | 8/2004 | Schneider |
| 2004/0185900 | A1 | 9/2004 | McElveen |
| 2004/0209608 | A1 | 10/2004 | Kouznetsov et al. |
| 2004/0225887 | A1 | 11/2004 | O'Neil et al. |
| 2004/0259532 | A1 | 12/2004 | Isomaki et al. |
| 2005/0010821 | A1 | 1/2005 | Cooper et al. |
| 2005/0015443 | A1 | 1/2005 | Levine et al. |
| 2005/0074106 | A1 | 4/2005 | Orlamunder et al. |
| 2005/0076246 | A1 | 4/2005 | Singhal |
| 2005/0091308 | A1 | 4/2005 | Bookman et al. |
| 2005/0125779 | A1 | 6/2005 | Kelley et al. |
| 2005/0130627 | A1 | 6/2005 | Calmels et al. |
| 2005/0138395 | A1* | 6/2005 | Benco et al. .................. 713/188 |
| 2005/0138413 | A1 | 6/2005 | Lippmann et al. |
| 2005/0138450 | A1 | 6/2005 | Hsieh |
| 2005/0154796 | A1 | 7/2005 | Forsyth |
| 2005/0186954 | A1 | 8/2005 | Kenney |
| 2005/0197099 | A1 | 9/2005 | Nehushtan |
| 2005/0221800 | A1 | 10/2005 | Jackson et al. |
| 2005/0227669 | A1 | 10/2005 | Haparnas |
| 2005/0237970 | A1 | 10/2005 | Inoue |
| 2005/0240999 | A1 | 10/2005 | Rubin et al. |
| 2005/0254654 | A1 | 11/2005 | Rockwell et al. |
| 2005/0278777 | A1 | 12/2005 | Loza |
| 2005/0282533 | A1 | 12/2005 | Draluk et al. |
| 2006/0026283 | A1 | 2/2006 | Trueba |
| 2006/0073820 | A1 | 4/2006 | Craswell et al. |
| 2006/0075388 | A1 | 4/2006 | Kelley et al. |
| 2006/0080680 | A1 | 4/2006 | Anwar et al. |
| 2006/0095454 | A1 | 5/2006 | Shankar et al. |
| 2006/0101518 | A1 | 5/2006 | Schumaker et al. |
| 2006/0130145 | A1 | 6/2006 | Choi et al. |
| 2006/0150238 | A1 | 7/2006 | D'Agostino |
| 2006/0150256 | A1 | 7/2006 | Fanton et al. |
| 2006/0179485 | A1 | 8/2006 | Longsine et al. |
| 2006/0217115 | A1 | 9/2006 | Cassett et al. |
| 2006/0218482 | A1 | 9/2006 | Ralston et al. |
| 2006/0224742 | A1 | 10/2006 | Shahbazi |
| 2006/0236325 | A1 | 10/2006 | Rao et al. |
| 2006/0253205 | A1 | 11/2006 | Gardiner |
| 2006/0253584 | A1 | 11/2006 | Dixon et al. |
| 2006/0272011 | A1 | 11/2006 | Ide et al. |
| 2006/0277408 | A1 | 12/2006 | Bhat et al. |
| 2006/0294582 | A1 | 12/2006 | Linsley-Hood et al. |
| 2007/0005327 | A1 | 1/2007 | Ferris |

(56) References Cited

U.S. PATENT DOCUMENTS

| | | |
|---|---|---|
| 2007/0011319 A1 | 1/2007 | Mcclure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Bryne et al. |
| 2007/0028095 A1 | 2/2007 | Allen et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0186282 A1 | 8/2007 | Jenkins |
| 2007/0190995 A1 | 8/2007 | Wang et al. |
| 2007/0214504 A1 | 9/2007 | Milani Comparetti et al. |
| 2007/0220608 A1 | 9/2007 | Lahti et al. |
| 2007/0240127 A1 | 10/2007 | Tuvell et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0293263 A1 | 12/2007 | Eslambolchi et al. |
| 2007/0297610 A1 | 12/2007 | Chen et al. |
| 2008/0028470 A1 | 1/2008 | Remnington et al. |
| 2008/0046369 A1 | 2/2008 | Wood |
| 2008/0046557 A1 | 2/2008 | Cheng |
| 2008/0047007 A1* | 2/2008 | Satkunanathan et al. ....... 726/22 |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft et al. |
| 2008/0086773 A1* | 4/2008 | Tuvell et al. .................... 726/23 |
| 2008/0086776 A1 | 4/2008 | Tuvell et al. |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0318562 A1 | 12/2008 | Featherstone et al. |
| 2009/0172227 A1 | 7/2009 | Taylor et al. |
| 2009/0199298 A1* | 8/2009 | Miliefsky ........................ 726/25 |
| 2009/0205016 A1 | 8/2009 | Milas |
| 2009/0205047 A1 | 8/2009 | Podjarny |
| 2009/0248623 A1 | 10/2009 | Adelman et al. |
| 2009/0293125 A1 | 11/2009 | Szor |
| 2010/0019731 A1 | 1/2010 | Connolly et al. |
| 2010/0064341 A1* | 3/2010 | Aldera .............................. 726/1 |
| 2010/0097494 A1 | 4/2010 | Gum et al. |
| 2010/0100591 A1 | 4/2010 | Burgess et al. |
| 2010/0100939 A1 | 4/2010 | Mahaffey et al. |
| 2010/0100959 A1 | 4/2010 | Mahaffey |
| 2010/0100963 A1 | 4/2010 | Mahaffey |
| 2010/0100964 A1 | 4/2010 | Burgess et al. |
| 2010/0154032 A1 | 6/2010 | Ollmann |
| 2010/0210240 A1 | 8/2010 | Mahaffey et al. |
| 2010/0240419 A1 | 9/2010 | Horino |
| 2010/0313270 A1 | 12/2010 | Kim et al. |
| 2010/0317324 A1 | 12/2010 | Brown et al. |
| 2010/0332593 A1 | 12/2010 | Barash et al. |
| 2011/0047033 A1 | 2/2011 | Mahaffey et al. |
| 2011/0047594 A1 | 2/2011 | Mahaffey et al. |
| 2011/0047597 A1 | 2/2011 | Barton et al. |
| 2011/0047620 A1 | 2/2011 | Mahaffey et al. |
| 2011/0119765 A1 | 5/2011 | Hering et al. |
| 2011/0145920 A1 | 6/2011 | Burgess et al. |
| 2011/0171923 A1 | 7/2011 | Daly et al. |
| 2011/0241872 A1 | 10/2011 | Mahaffey |
| 2011/0296510 A1 | 12/2011 | Hatlelid et al. |
| 2012/0042382 A1 | 2/2012 | Mahaffey |
| 2012/0060222 A1 | 3/2012 | Burgess et al. |
| 2012/0072569 A1 | 3/2012 | Xu |
| 2012/0084836 A1 | 4/2012 | Mahaffey et al. |
| 2012/0084864 A1 | 4/2012 | Burgess et al. |
| 2012/0096555 A1 | 4/2012 | Mahaffey |
| 2012/0110174 A1 | 5/2012 | Mahaffey et al. |
| 2012/0124239 A1 | 5/2012 | Shribman et al. |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0196571 A1 | 8/2012 | Grkov et al. |
| 2012/0233695 A1 | 9/2012 | Mahaffey et al. |
| 2012/0259954 A1 | 10/2012 | McCarthy et al. |
| 2012/0303735 A1 | 11/2012 | Raciborski et al. |
| 2012/0317233 A1 | 12/2012 | Redpath |
| 2012/0324076 A1 | 12/2012 | Zerr et al. |
| 2012/0324094 A1 | 12/2012 | Wyatt et al. |
| 2012/0324568 A1 | 12/2012 | Wyatt et al. |
| 2013/0019311 A1 | 1/2013 | Swildens et al. |
| 2013/0023209 A1 | 1/2013 | Fisher et al. |
| 2013/0041974 A1 | 2/2013 | Luna et al. |
| 2013/0047034 A1 | 2/2013 | Salomon et al. |
| 2013/0086682 A1 | 4/2013 | Mahaffey et al. |

FOREIGN PATENT DOCUMENTS

| | | |
|---|---|---|
| WO | 2006110181 | 10/2006 |
| WO | 2007081356 | 7/2007 |
| WO | 2008007111 | 1/2008 |
| WO | 2008057737 | 5/2008 |
| WO | 2010048218 | 4/2010 |
| WO | 2010048220 | 4/2010 |
| WO | 2012027588 | 1/2012 |

OTHER PUBLICATIONS

Richardson, Alexis "Introduction to RabbitMQ," Google UK, Sep. 25, 2008, available at <http://www.rabbitmq.com/resources/google-tech-talk-final/alexis-google-rabbitmq-talk.pdf>, retrieved Mar. 30, 2012, 33 pages.

Fisher, Oliver "Malware? We Don't Need No Stinking Malware!," Google, Oct. 24, 2008, available at <http://googlewebmastercentral.blogspot.com/2008/10/malware-we-dont-need-no-stinking.html>, retrieved Mar. 30 2012, 11 pages.

Reardon, Marguerite "Mobile Phones That Track Your Buddies," Cnet, Nov. 14, 2006, available at <http://news.cnet.com/Mobile-phones-that-track-your-buddies/2100-1039_3-6135209.html>, retrieved Mar. 30, 2012, 4 pages.

Fette, Ian "Understanding Phishing and Malware Protection in Google Chrome," The Chromium Blog, Nov. 14, 2008, available at <http://blog.chromium.org/2008/11/understanding-phishing-and-malware.htm>, retrieved May 17, 2011, 6 pages.

Kincaid, Jason "Urban Airship Brings Easy Push Notifications to Android," TechCrunch, Aug. 10, 2010, available at <http://techcrunch.com/2010/08/10/urban-airship-brings-easy-push-notifications-to-android/>, retrieved Jun. 16, 2011, 5 pages.

Keane, Justin K. "Using the Google Safe Browsing API from PHP," Mad Irish, Aug. 7, 2009, available at <http://www.madirish.net/node/245>, retrieved Mar. 30, 2012, 5 pages.

(56) References Cited

OTHER PUBLICATIONS

Jefferies, Charles P. "Webroot AntiVirus 2010 With Spy Sweeper Review," Notebook Review, Jun. 22, 2010, available at <http:// http://www.notebookreview.com/default.asp?newsID=5700&review=Webroot+AntiVirus+2010+With+Spy+Sweeper+Review>, retrieved May 18, 2011, 3 pages.
"Berry Locator", 2007, Mobireport, LLC, 1 page.
"Firefox", Wikipedia, Jul. 20, 2011, available at <http://en.wikipedia.org/wiki/firefox> Retrieved Aug. 10, 2011, 37 Pages.
"F-Secure Mobile Security for S60 Users Guide", F-Secure Corporation 2009, pp. 1-34.
"Java Virtual Machine", Wikipedia, Aug. 7, 2011, Available at <http://en.wikipedia.org/wiki/Java_Virtual_Machine> Retrieved Aug. 10, 2011, 7 pages.
"Kaspersky Mobile Security", Kaspersky Lab 1997-2007, 1 page.
"Kaspersky Mobile Security", Kaspersky Lab 2008, available at <http://www.kaspersky.com/kaspersky_mobile_security> Retrieved Sep. 11, 2008, 2 Pages.
"Norton Smartphone Security",Symantec, 2007, Available at <http://www.symantec.com/norton/smartphone-security> Retrieved Oct. 21, 2008, 2 pages.
"PhoneBak PDA Phone Anti-theft software for your PDA phone", 2007, Bak2u Pte Ltd (Singapore) pp. 1-4.
"PhoneBak: Mobile Phone Theft Recovery Software", 2007, Westin Tech.
"Symantec Endpoint Protection", Symantec, 2008, Available at <http://www.symantec.com/business/products/family.jsp?familyid=endpointsecurity>, 6 pages.
"Symantec Mobile Security Suite for Windows Mobile", Symantec, 2008 Available at <http://www.symantec.com/business/products/sysreq.jsp?pcid=2241&pvid=mobile_security_suite_1>, 5 pages.
Summerson, Cameron "5 Android Antivirus Apps Compared, Find Out Which Ones Are Worth Having!," Android Headlines, Mar. 8, 2011, available at <http://androidheadlines.com/2011/03/5-android-antivirus-apps-comapred-find-out-which-ones-are-worth-having.html>, retrieved Mar. 30, 2012, 9 pages.
"Android Cloud to Device Messaging Framework," Google Code Labs, available at <http://code.google.com/android/c2dm/>, retrieved Sep. 14, 2011, 9 pages.
"BlackBerry Push Service Overview," Dec. 16, 2009, available at <http://us.blackberry.com/developers/platform/pushapi.jsp#tab_tab_resources>, retrieved Sep. 14, 2011, 21 pages.
"eSoft unveils SiteFilter 3.0 for OEMs," Infosecurity, Mar. 23, 2010, available at <http://www.infosecurity-magazine.com/view/8273/esoft-unveils-sitefilter-30-for-oems/>, retrieved Mar. 30, 2012, 2 pages.
"Get the Physical Location of Wireless Router From its MAC Address (BSSID)," Coderrr, Sep. 10, 2008, available at <http://coderrr.wordpress.com/2008/09/10/get-the-physical-location-of-wireless-router-from-its-mac-address-bssid/>, retrieved Mar. 30, 2012, 13 pages.
"Hooking—Wikipedia, the Free Encyclopedia," Internet Archive Wayback Machine, Apr. 13, 2010, available at <http://web.archive.org/web/20100415154752/http://en.wikipedia.org/wiki/Hooking>, retrieved Mar. 30, 2012, 6 pages.
Mytton, David "How to Build an Apple Push Notification Provider Server (Tutorial)," Server Density, Jul. 10, 2009, available at <http://blog.serverdensity.com/2009/07/10/how-to-build-an-apple-push-notification-provider-server-tutorial/>, retrieved Apr. 2, 2012, 33 pages.
"Pidgin the Universal Chat Client," Pidign, available at <http://www.pidgin.im/>, retrieved Sep. 14, 2011, 14 pages.
Pogue, David "Simplifying the Lives of Web Users," The New York Times, Aug. 18, 2010, available at <http://www.nytimes.com/2010/08/19/technology/personaltech/19pogue.html>, retrieved May 17, 2011, 5 pages.
"Twilio Cloud Communications Web Service API for Building Voice and SMS Applications," Twilio available at <http://www.twilio.com>, retrieved Sep. 14, 2011, 12 pages.
"Understanding Direct Push," Microsoft, Feb. 18, 2009, available at <http://technet.microsoft.com/en-us/library/aa997252(v=exchg.80).aspx>, retrieved Mar. 30, 2012, 3 pages.
"Urban Airship: Powering Modern Mobile," available at <http://urbanairship.com/products/>, retrieved Sep. 16, 2011, 14 pages.
"zVeloDB URL Database," zVelo, available at <https://zvelo.com/technology/zvelodb-url-database>, retrieved Mar. 30, 2012, 2 pages.
Amazon.com: Mining the Web Discovering Knowledge from Hypertext Data (9781558607545): Soumen Chakrabarti: Books, Amazon available at <http://www.amazon.com/exec/obidos/ASIN/1558607544/>, retrieved Jun. 7, 2012, pp. 1-7.
Clickatell, available at <http://www.clickatell.com>, retrieved Sep. 14, 2011, 11 pages.
Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.
Diligenti, M., et al., Focused Crawling Using Context Graphs:, Proceedings of the 26th VLDB Conference, Cairo, Egypt, 2000, pp. 1-8.
Grafio "Stay Secure", Opera Software, Sep. 29, 2008, Available at <http://widgets.opera.com/widget/4495> Retrieved Oct. 21, 2008, 4 pages.
McAfee, Internet Archive, Way Back Machine, available at <http://web.archive.org/web/20080611095201/www.qualys.com/solutions/vulnerability_management>retrieved Feb. 24, 2011, 1 page.
PagerDuty, available at <http://www.pagerduty.com>, retrieved Sep. 14, 2011, 23 pages.
PCT International Search Report and Written Opinion of the International Searching Authority for PCT/US2009/061370; Mailed on Dec. 14, 2009; pp. 1-12.
PCT International Search Report and Written Opinion of the International Searching Authority for PCT/US2009/061372; Mailed on Mar. 24, 2010; pp. 1-16.
PCT International Search Report and Written Opinion of the International Searching Authority for PCT/US2011/049182; Mailed on Dec. 23, 2011; pp. 1-11.
Prey, available at <http://preyproject.com/>, retrieved Jan. 10, 2012, 4 pages.
Qualys, "Executive Dashboard," Internet Archive, Way back Machine, availble at <http://web.archive.org/web20080507161417/www.qualys.com/products/screens/?screen=Executive + Dashboard>, retrieved Feb. 23, 2011, 1 page.
Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.
Real world Computing, Jun. 16, 2008 (PC Pro), pp. 1-2.
Simone, "Playing with ActiveMQ," Mostly Useless, Dec. 27, 2007, available at <http://www.mostly-useless.com/blog/2007/12/27/playing-with-activemq/>, retrieved Mar. 30, 2012, 6 pages.
Teh, Joe, "Norton 360 Version 3.0 Review,"Mar. 9, 2009, Available at <http://techielobang-com/blog/2009/03/09/norton-360-version-30-review/> Retrieved Feb. 23, 2011, 12 pages.
Trillian, available at <http://www.trillian.im/>, retrieved Sep. 14, 2011, 24 pages.
Virus Total, VT Community, www.virustotal.com/index.html; Dated Dec. 16, 2011; 44 Pages.
Windows Update, Internet Archive, Way Back Machine, available at <http://web.archive.org/web/20071022193017/http://en.wikipedia.org/wiki/Windows_Update> Retrieved Feb. 23, 2011, 3 pages.
Sprite Mobile, Sprite Backup, Internet Archive, Way Back Machine, available at http://web.archive.org/web/20080901220103/http://www.spritesoftware.com/?page_id=280, 4 pages, Retrieved Jan. 16, 2013.
Sprint Nextel, Mobile Locator, Internet Archive, Way Back Machine, available at http://web.archive.org/web/20080901070835/http://www.nextel.com/en/solutions/gps/mobile_locator.shtml, 2 pages, Retrieved Jan. 16, 2013.

(56) References Cited

OTHER PUBLICATIONS

PCT International Preliminary Report on Patentability for PCT/US2011/049182; Mailed on Mar. 7, 2013; pp. 1-9.

"Virgin Media—Phone Lost or Stolen?", web page downloaded Apr. 11, 2013 from http://www.virginmobile.com/vm/ukCoverage.do?contentId=insurance.howdoi.sm283.

"Sprint—Report that your device is lost or stolen", web page downloaded Apr. 11, 2013 from http://support.sprint.com/support/article/Report_that_your_device_is_lost_or_stolen/case-ba416758-20090629-143222.

PCT International Search Report and Written Opinion of the International Searching Authority for PCT/US2013/027166, mailed on Jun. 19, 2013; received on Jun. 21, 2013.

* cited by examiner

EVENT-BASED SECURITY STATE ASSESSMENT AND DISPLAY FOR MOBILE DEVICES

CROSS REFERENCE TO RELATED APPLICATIONS

The present application is a continuation of pending U.S. application Ser. No. 13/267,731, filed on Jun. 10, 2011, which is a continuation of U.S. application Ser. No. 12/255,635, filed on Oct. 21, 2008, now U.S. Pat. No. 8,060,936. The present application is related to the following U.S. patent applications: U.S. application Ser. No. 12/255,632, filed Oct. 21, 2008, now U.S. Pat. No. 8,087,067, "SECURE MOBILE PLATFORM SYSTEM," U.S. application Ser. No. 12/255,626, filed Oct. 21, 2008, now U.S. Pat. No. 8,099,472, "SYSTEM AND METHOD FOR A MOBILE CROSS-PLATFORM SOFTWARE SYSTEM," U.S. application Ser. No. 12/255,621, filed Oct. 21, 2008, now U.S. Pat. No. 8,108,933, "SYSTEM AND METHOD FOR ATTACK AND MALWARE PREVENTION," and U.S. application Ser. No. 12/255,614, filed Oct. 21, 2008, now U.S. Pat. No. 8,051,480, "SYSTEM AND METHOD FOR MONITORING AND ANALYZING MULTIPLE INTERFACES AND MULTIPLE PROTOCOLS" which are all hereby incorporated by reference.

FIELD

The present invention relates generally to methods and systems for providing security status information for display on a mobile device, or on other computers monitoring activity on the mobile device.

BACKGROUND

Mobile devices such as cell phones and personal digital assistants (PDAs) can be attacked by exploits or viruses that are specifically adapted for the mobile environment. Exploits can take advantage of security vulnerabilities associated with a mobile device in order to execute malicious code or perform undesired actions on the device. Potentially, exploits can bypass permissions or policies set by the user, manufacturer, operating system, or mobile operator and give the attacker complete control of the device. Mobile viruses are typically spread by downloading infected programs or files. Some viruses only become active if the recipient chooses to accept the virus file and run it on the mobile device. Other viruses, when combined with exploits, are self-propagating worms that may not need user intervention in order to spread, potentially creating a very severe and widespread security problem.

Devices may be compromised by viruses and exploits over wide area networks, such as the Internet or a cellular network, and local wireless networks, such as Wi-Fi or Bluetooth. For example, some devices which are equipped with Bluetooth allow other nearby Bluetooth-enabled devices to transfer files or other data such as contact information. Bluetooth-enabled devices that are infected with viruses often search for nearby devices that are in "discoverable" mode. When an infected device discovers a target, it may send a virus disguised as a security update or another item designed to fool the target device's user into accepting the transfer and executing the virus. If a virus were to utilize an exploit instead of disguising itself in order to get a target user to accept the file transfer, a device which is in "discoverable" mode could become infected without the user being able to intervene.

In addition to being able to propagate viruses, exploits may be able to directly perform malicious actions on vulnerable devices. Such exploits may be used by attackers to steal information, charge money to the target device's phone bill, or prevent a device from functioning properly. Although vulnerabilities which take advantage of exploits may be fixed if the software vendor responsible for the vulnerability provides a patch or firmware upgrade, such fixes are often costly and time consuming to release and difficult for users or IT organizations to apply.

It is important that both individual users and IT organization be able to verify that their security protection is functioning properly and be aware of the security state of their devices so as to be able to remediate or investigate issues as early as possible. If a device or group of devices has a security problem or has recently been attacked, the user or administrator responsible may not immediately know because mobile devices and existing solutions may not continuously present security status information and attempt to push important events to users and administrators.

What is needed is a system and method for identifying, reporting, and preventing mobile security problems and for providing security information concerning the state of a mobile device or group of mobile devices to a user or administrator. The system and method should keep users or administrators continuously aware of security status, recent security-related events, and potential security threats without requiring them to repeatedly seek out security-related information.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

It should be appreciated that the present invention can be implemented in numerous ways, including as a process, an apparatus, a system, a device, a method, or a computer readable medium such as a computer readable storage medium comprising computer program instructions or a computer network wherein computer program instructions are sent over optical or electronic communication links. Applications, software programs or computer readable instructions may be referred to as components or modules. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The present invention is directed towards a system that displays the security status and security event information for a mobile device running security software. In an embodiment, the mobile device has a security system that runs on the mobile device which analyzes network data and files for security threats and determines the security state of the mobile device. The security system produces graphical displays indicating the security state of the mobile device and detailing the security events that have been detected and processed. In this embodiment, the mobile device may obtain periodic updates of mobile virus information from a server. The mobile device may also send the security information to a server for display on a computer to permit monitoring of security information relating to the mobile device.

Figure 1:
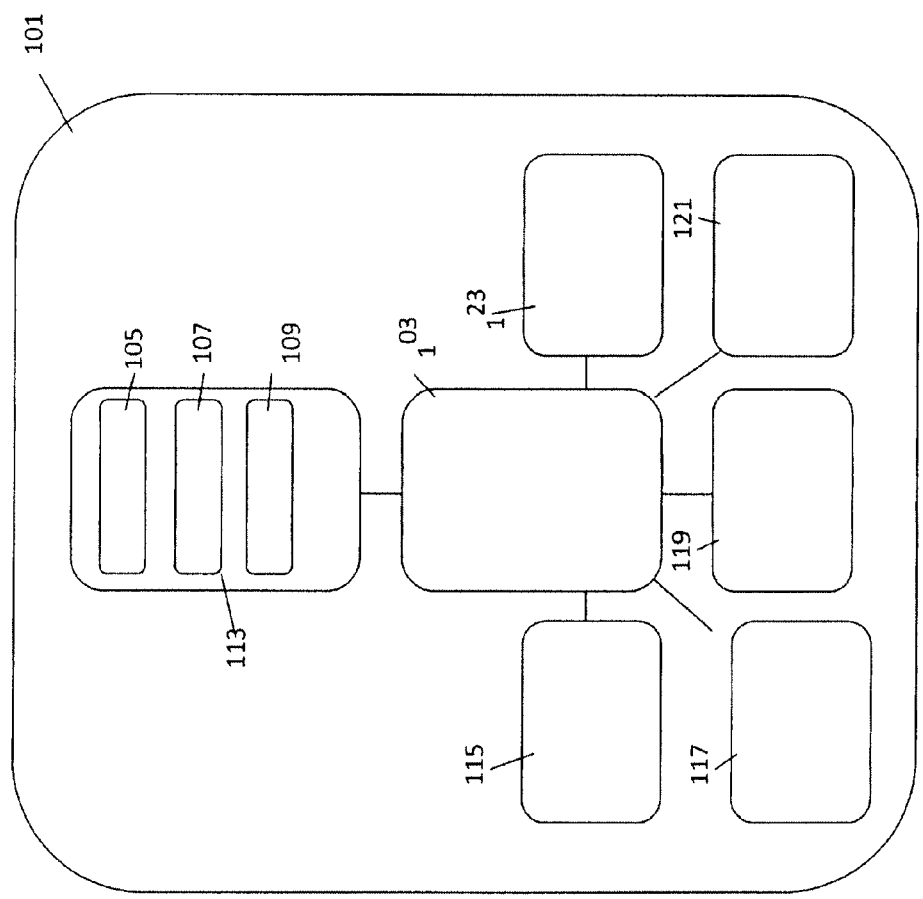
FIG. 1 is an exemplary block diagram depicting an embodiment of a mobile device which detects and processes security events.

With reference to FIG. 1, a block diagram of an embodiment of the mobile device 101 is illustrated. The mobile device 101 can include: an operating system 113, an input device 115, a radio frequency transceiver(s) 117, a visual display 121, database of security event information 123, and a battery or power supply 119. Each of these components can be coupled to a central processing unit (CPU) 103. The operating system 113 runs on the CPU 103 and provides an interface between security system application programs and the mobile device hardware.

The inventive system can receive data through an RF transceiver(s) 115 which may be able to communicate with various other electronic devices. The RF transceiver(s) 115 can transmit and receive data over various networks, for example: Bluetooth, local area networks such as Wi-Fi, and cellular networks such as GSM or CDMA. The RF transceiver(s) 115 can transmit and receive various types of data including voice, text, photos, video, SMS messages, applications, etc. All forms of data packets can be analyzed and processed by the inventive system. Additional details about the analysis and processing of data is described in U.S. application Ser. No. 12/255,614, filed Oct. 21, 2008, now U.S. Pat. No. 8,051,480, "System and Method for Monitoring and Analyzing Multiple Interfaces And Multiple Protocols."

In an embodiment, a local security component 105, an information gathering component 107 and a transport component 109, can be application programs that are downloaded and integrated with the mobile device operating system 113. Much of the source code for these security components can be re-used between various mobile device platforms by using a cross-platform software architecture. The local security component 105, an information gathering component 107 and a transport component 109 provide specific security status information which can include an overall security state and security event information. Additional details of the mobile platform system and the processing performed by the security components are disclosed in U.S. patent application Ser. No. 12/255,632, filed Oct. 21, 2008, "Secure Mobile Platform System" and U.S. patent application Ser. No. 12/255,621, filed Oct. 21, 2008, "System and Method For Attack And Malware Prevention."

Figure 9:
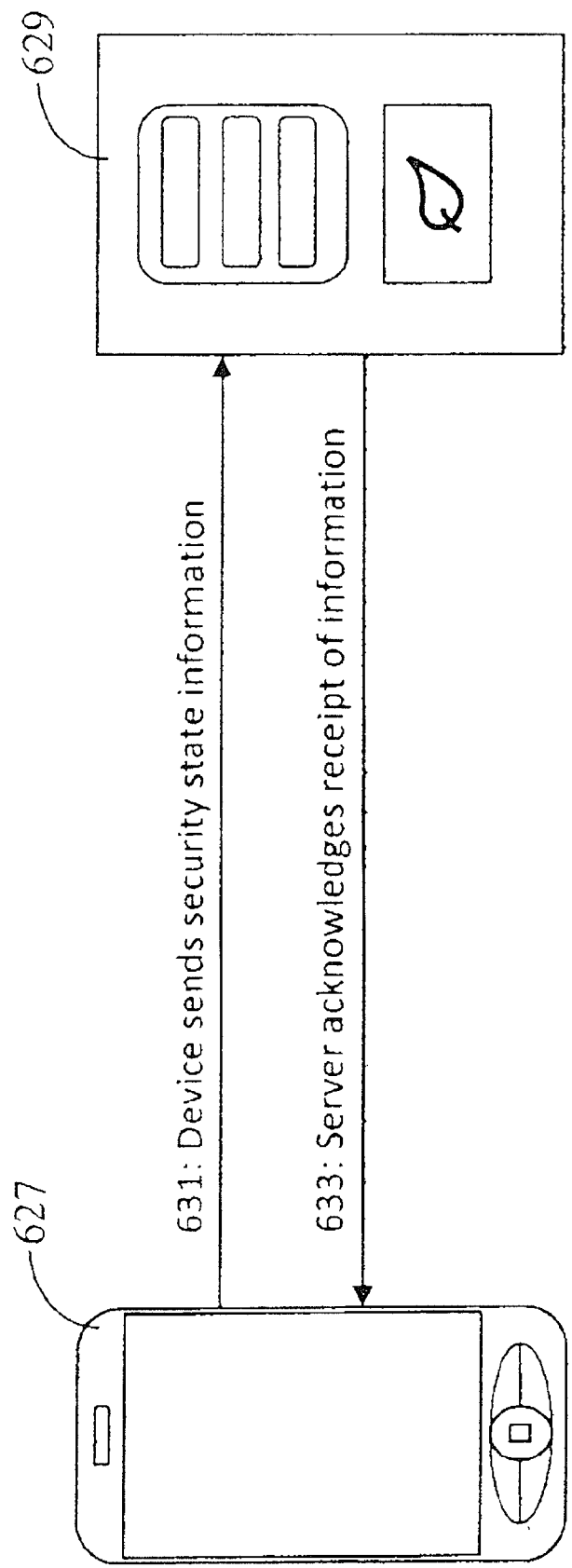
FIG. 9 is an exemplary messaging diagram illustrating the flow of communications according to an embodiment of the present invention.

In an embodiment, a device's state may be sent to server 629 so that it has the most updated security information about the device. This security state information may also include the device's identifier, configuration, settings, information on recent security events, as well as the device's state. As shown in FIG. 9, mobile communications device 627 may send this security data to server 629 over the network (step 631). In step 633, server 629 may acknowledge receipt of the security data from device 627.

In an embodiment, the local security component on the mobile device can identify security events by analyzing files or data stored on the device, messages such as function or system calls between components on the device, or network data flowing into or out of the device for security events. The security events can include finding possible threats such as exploits, suspicious network traffic, viruses, malware, SMS message or phone call spam, suspicious system or function calls, authentication failures, etc. For example, virus detection can be performed using a list of virus signatures. The local security component 105 can examine the contents of the mobile device memory and compare those files against a database of known virus "signatures." In other embodiments, the local security component 105 may also utilize an algorithm that performs virus detection based on common virus behaviors or common virus characteristics. This alternative virus detection has the ability to detect viruses that do not have known virus signatures. Additional details regarding alternative attack and malware prevent systems are disclosed in U.S. patent application Ser. No. 12/255,621, filed Oct. 21, 2008, "System And Method For Attack And Malware Prevention."

In addition to the detection of viruses, the local security component 105 can also detect security threats facing the device over various network interfaces. In an embodiment, the local security component can analyze network data using any combination of a "known bad" network data detection component, a "known good" protocol content and statefulness analysis component, and a decision component. Upon examining the network data, the local security component 105 may identify security events including: a protocol length mismatch, a protocol value violation, a value violation for a protocol in a given state, a protocol state transition violation, a firewall rule violation, a known bad piece of network data, or a piece of network data decided to be bad. Once a security event has been identified and associated with incoming or outgoing data, the local security component 105 can determine how to protect the mobile device.

Table 1 below is a listing of some possible events that can be detected by analyzing the files or data stored on the device, function or system calls, or network data and example associated severity levels. The severity level can vary depending both on the event type and the parameters associated with an event. For example, regarding an event corresponding to a virus scan, if no viruses are found, the event would have a low severity. If a virus was found, but it was quarantined, the severity would be slightly higher. If a virus was found, but it could not be quarantined, the severity level would be high.

TABLE 1

| DETECTED EVENT | SEVERITY (MAX. 5) |
| --- | --- |
| Virus scan (1 virus found, 0 viruses quarantined) | 5 |
| Known bad data | 4 |
| Virus scan (1 virus found, 1 virus quarantined) | 3 |
| Decidedly bad data | 3 |
| Virus found and quarantined | 3 |
| Protocol length mismatch | 3 |
| Protocol value violation while in specific state | 3 |
| Protocol value violation | 3 |
| Protocol state violation | 2 |

TABLE 1-continued

| DETECTED EVENT | SEVERITY (MAX. 5) |
| --- | --- |
| Local authentication failure | 2 |
| Spam blocked | 1 |
| Firewall rule violation | 1 |
| Virus scan (No viruses found) | 0 |

The local security component 105 sends the security event information to the information gathering component 107 that quantifies the security events and the severity of the security events. For example, the information gathering component 107 processes the detected security events and produces security state assessment results for the mobile device 101. In an embodiment, the security state assessment includes an overall security condition of the mobile device. The security state assessment is also displayed as a graphical representation of the number of security events detected, a chart illustrating the rate of security events detected by the local security component 105 and other visual representations of security related status information. In an embodiment, the overall security assessment condition of the mobile device can range from "Everything is OK" when no severe security events are detected to "Infected", when a virus is detected on the mobile device. Other overall security assessment conditions include "Compromised", when the local security component detects that an exploit or other attack has been successful on the device or the trust model has been otherwise compromised, "Warning", where the local security component 105 is not configured for optimal security or other user action is desired, and "Error", where there are problems with the security of the mobile device that need to be fixed.

The security status information includes an overall mobile device security state as well as additional information about specific detected security events. The security event information is presented in various forms including: charts, graphs, graphical displays and text. The security event information presentation may vary depending upon the display on the mobile device on the client computer. The security status data displayed on the mobile device itself can be in a substantially different format than similar information about the mobile device displayed on the client computer, website or e-mail.

In an embodiment, when data is sent or received by the RF transceiver 115, aspects of the data are analyzed by the local security component 105 to determine if the data should be identified as a security event and if actions should be taken. As noted above, the assessment may involve one or more possible security analysis components, including a known bad analysis component, a known good analysis component, and a decision component. The local security component 105 stores and processes the data concerning security events and determines an overall device-wide security state assessment. The security component 105 also forwards the individual and cumulative security event information to the information gathering component 107 for further processing and producing graphical representations of the device-wide security state. The security state of the mobile device is displayed in the form of a graphical security status icon, security event charts and various other outputs that communicate security information about the mobile device 101. The graphical data is then sent to the transport component 109 which forwards the security state assessment data to a visual display on the mobile device. In another embodiment, the mobile device security information is transmitted to a server(s) and a client computer(s) for display on a device remote from the mobile device.

Figure 2:
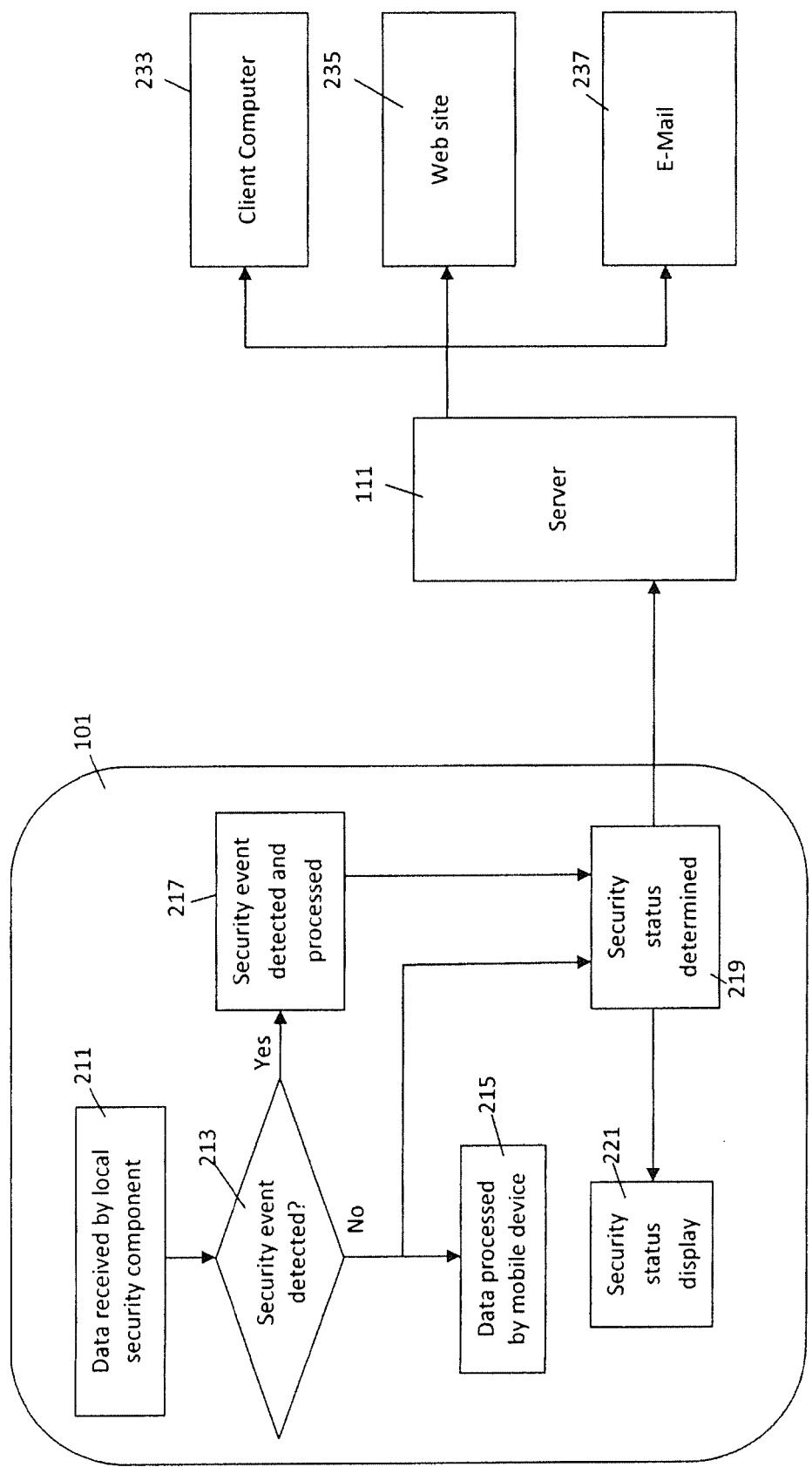
FIG. 2 is an exemplary flow chart illustrating the processing of security events on a mobile device.

The processing of data such as files or data stored on the device, function or system calls, or network data, by the mobile device 101 is illustrated in more detail with reference to FIG. 2. The data is received by the local security component 211. The local security component analyzes aspects of the data to determine if a security event is detected 213. If no security events are detected, the data is determined to be safe and is processed normally by the mobile device 215. In the preferred embodiment, the screened safe data will pass through the local security component in a transparent manner.

If the local security component onboard the mobile device detects a security problem with the data, one or more security events may be triggered. The local security component automatically performs defensive actions to protect the mobile device 101 from the immediate threat. The event or events generated will be processed 217 in order to determine if further actions need to be taken. The type of defensive processing performed by the local security component depends upon the context and type of data being analyzed. For example, the system can drop network data considered to be harmful or may disconnect one or more protocol connections associated with the data. The security component produces an event log that is stored and updated as new events are detected. Although monitoring of the security events is primarily directed towards data, hardware defects may also create security events. For example, physical damage, dead batteries or other defective hardware in the mobile device can cause the security component to detect a security event.

In an embodiment, the local security component analyzes the cumulative security events and the non-security event data to determine an overall security status for the mobile device 219. This security assessment is based upon the type, severity and quantity of the security events, their associated data, and the non-security events and data that are received and processed by the mobile device 101. The information gathering component further processes the security and non-security event data by creating various graphical and text based outputs for the security related information. The data processed by the information gathering component is sent to the transport component which controls how and where the security status will be displayed. The transport component displays the determined security status on the mobile device 221.

In addition to displaying the security status on the mobile device, the security status as well as events and event data can be forwarded to a server 111. The server may further process the events, event data, and security status information and/or output the status information to other electronic devices. A security status signal can be transmitted to a client computer 233 associated with the mobile device 101 through a security widget. In an embodiment, the widget may provide a perpetual display such as text or an icon that provides a graphical indication of the security status of the mobile device on the desktop or an operating system tool bar of the client computer. The security status information can also be output to a web site or database configured to provide content for a web site 235 for access through a web browser. The server 111 also sends e-mails 237 to an electronic address with security status updates and/or event summaries for the mobile device(s) being monitored. The system may require user authentication procedures before allowing remote access to the mobile device security information.

In an embodiment, the mobile device 101 also downloads updated security event information as well as other software and database updates from the server 121. If the mobile device and the client computer are coupled to the same network, it may be possible for the mobile device to transmit the security state information directly to the client computer, allowing the security assessment information to be displayed on the client computer.

Figure 3:
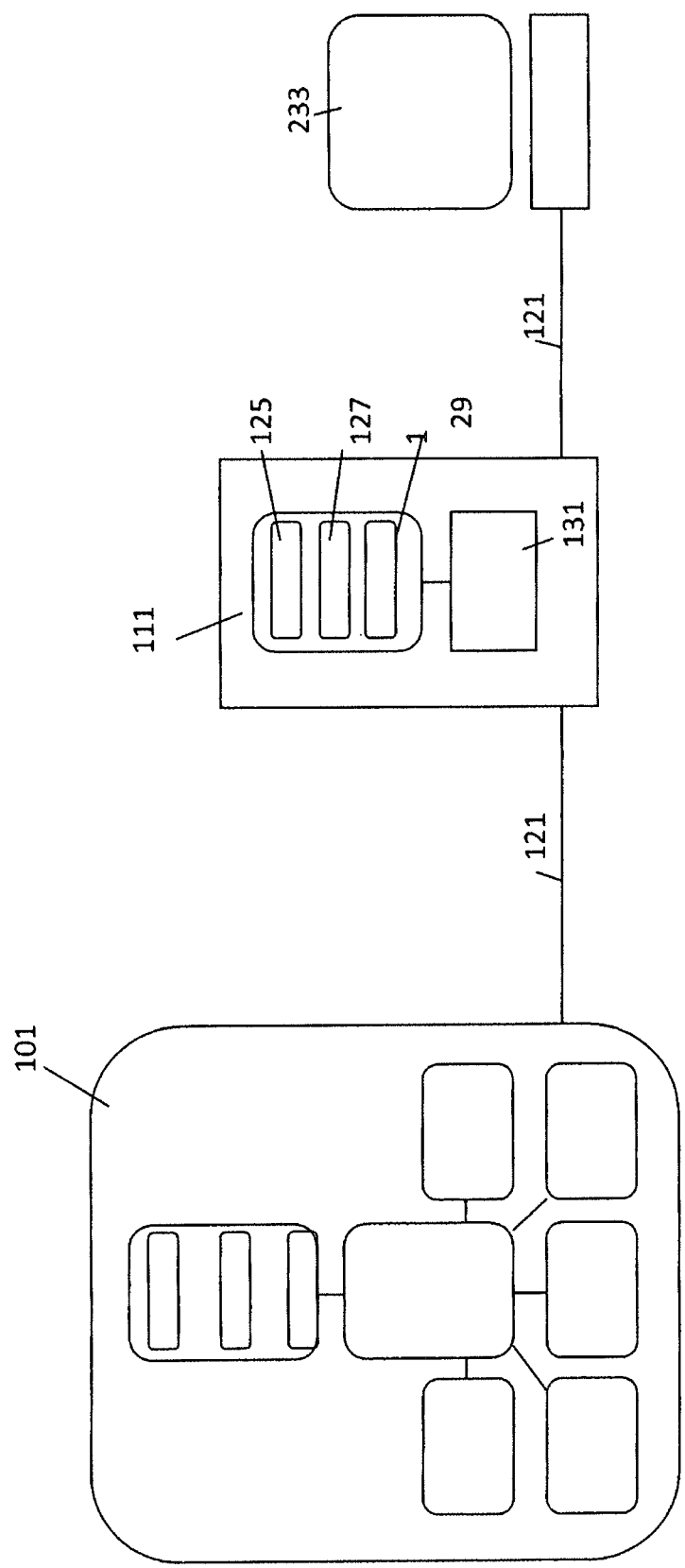
FIG. 3 is an exemplary block diagram depicting an embodiment of the present invention in which security events detected by a mobile device are processed on a remote server.

With reference to FIG. 3, an alternative configuration of the mobile device security system is illustrated. The mobile device 101 is coupled to a server 111 and the server 111 is coupled to a client computer 233 by the network 121. In this embodiment, the server 111 can include a remote security component 125, a remote information gathering component 127 and a remote transport component 129. The server can also contain a database 131 of security event information including: virus, malware, and network-based attack, and other security threat identification information. The mobile device 101 analyzes files or data stored locally, function or system calls, and/or network data; identifies security events; and forwards data concerning the events to the server 111 for processing. Like the local security component described above, the remote security component 125 processes the data concerning the security events to assess a security state of the mobile device. In this embodiment, the server 111 can receive raw data or data that has been partially or fully processed by the mobile device 101.

The remote security component 125 might also receive data concerning non-security events to determine an overall security status for the mobile device. In an embodiment, the server 111 can transmit the security status and the security event data back to the mobile device 101 for display. The server 111 can also transmit the security data to a remote client computer 233 through a client computer widget, a web site 235 or via e-mail 237. The security event information can include the overall security assessment and specific security events detected which are displayed on graphical user interfaces.

Figure 4:
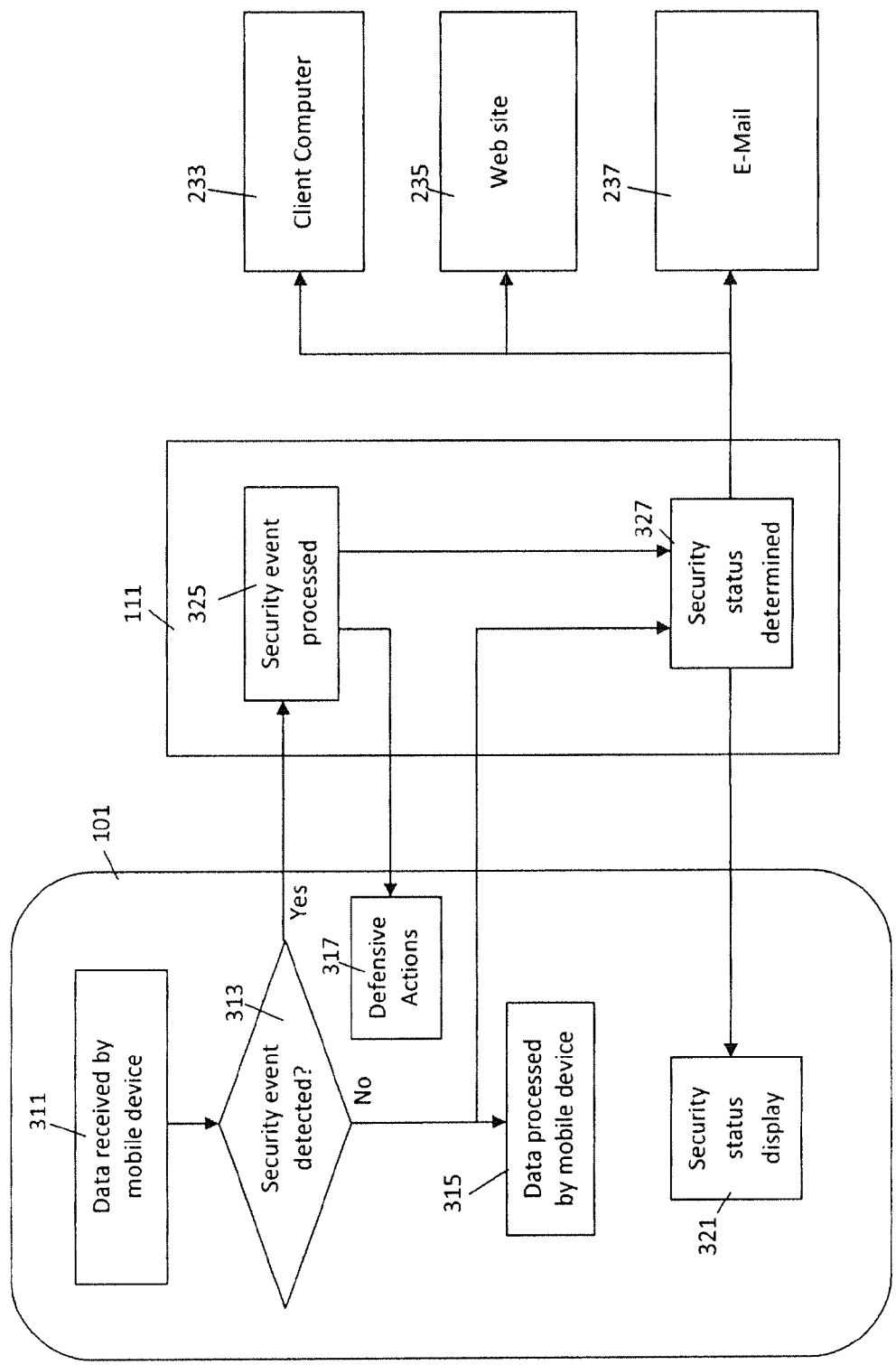
FIG. 4 is an exemplary flow diagram illustrating the processing of security events on a server.

With reference to FIG. 4, a flow chart of the mobile device with server embodiment of the present invention is illustrated. The mobile device 101 receives data 311 such as files or data stored locally, function or system calls, and/or network data from an internal or external source. The data is then analyzed by the security component for security events 313. If a security event is not detected by the local security component, the mobile device 101 processes the data normally 315. If a security event is detected, the event and its associated data is forwarded to the server 111 for processing 325 by the remote security component which performs many of the same function as the local security component in the mobile device 101 described above.

The remote security component will process the security event data in a manner corresponding to the type of security event detected in order to extract more information from the events and determine an accurate assessment of the security state of the device. For example, the security component on the mobile device 101 may have identified incoming network data as having a length mismatch. The security event is sent to the server 111 which may have information that identifies this specific length mismatch as a very dangerous attack attempting to exploit a recently discovered vulnerability in the mobile device's software. Such an event may be given very high severity to alert the user or administrator responsible for the device 101 about the attack. In another example, a mobile device 101 may run an executable file that is not considered to be a virus by the local security component. The device 101 sends an event corresponding to the execution of the file to the server 111 and the server 111 having more comprehensive virus signature information, may identify the file as a virus and determine the event to be severe. Automatic or manual defensive intervention can be performed to remove the infection. Various other processing can be performed for malware and other types of security events.

The remote security component may receive information about both security event and non-security-event data received by the mobile device. Based upon this cumulative data, the remote security component can determine an overall security status or assessment for the mobile device 327. If it the server 111 were to determine that the security component on the mobile device 101 was unable to stop any sort of security attack or virus/malware infection, the server 111 would update the device's security status accordingly. If needed, the server 111 may transmit commands to the device to remediate one or more security problems associated with events 317. These commands may be specialized for the particular virus or other security threat identified by the processing of one or more security events. The information gathering component can process the event information to produce charts, graphs, text outputs and graphical representations for the security state for the mobile device 101. The information gathering component at the server may also produce a log of security events for the mobile device. A transport component can then output the security event information to the mobile device 101 for persistently displaying the overall security status 321. The security event information can also be output by the server 111 to client computers 233 through a direct communication with a widget installed on the client computer 233. The widget will display the security status of the mobile device 101 on the client computer 233. Alternatively, the server 111 can post the status information for the mobile device 101 to a web site 235, which is accessible to client computers 235. The server 111 can also transmit the status information by e-mail to an address 237 associated with the mobile device.

As discussed, the processing of the security events can be performed by the local security component or a remote security component on a server. Because both modes of operation are automated, the functionality of both modes can appear identical to the user of the mobile device. A functional difference between the two modes of operation can be the updating of virus or other attack signatures. In order for the local security component to specifically identify current viruses and attacks, the signatures must be updated regularly. The mobile device can be configured to obtain updates automatically or manually. In contrast, the security event database on the remote server is maintained by the service provider and will always have the most current updates. Another difference is that the communications between the server and mobile device may not be persistent. While the server will normally be able to transmit and receive information persistently, the mobile device can be out of service periodically. The mobile device may not be in a good service area, the battery may be dead or the mobile device is turned off. There are various other reasons that the mobile device temporarily may not be able to transmit and receive data. Since communications may not be persistent, the security status information may need to be transmitted from the server to the mobile device in a store and forward manner. More specifically, the server may determine the mobile device security state and this information may need to be stored on the server until the mobile device is ready to receive data again.

Figure 5:
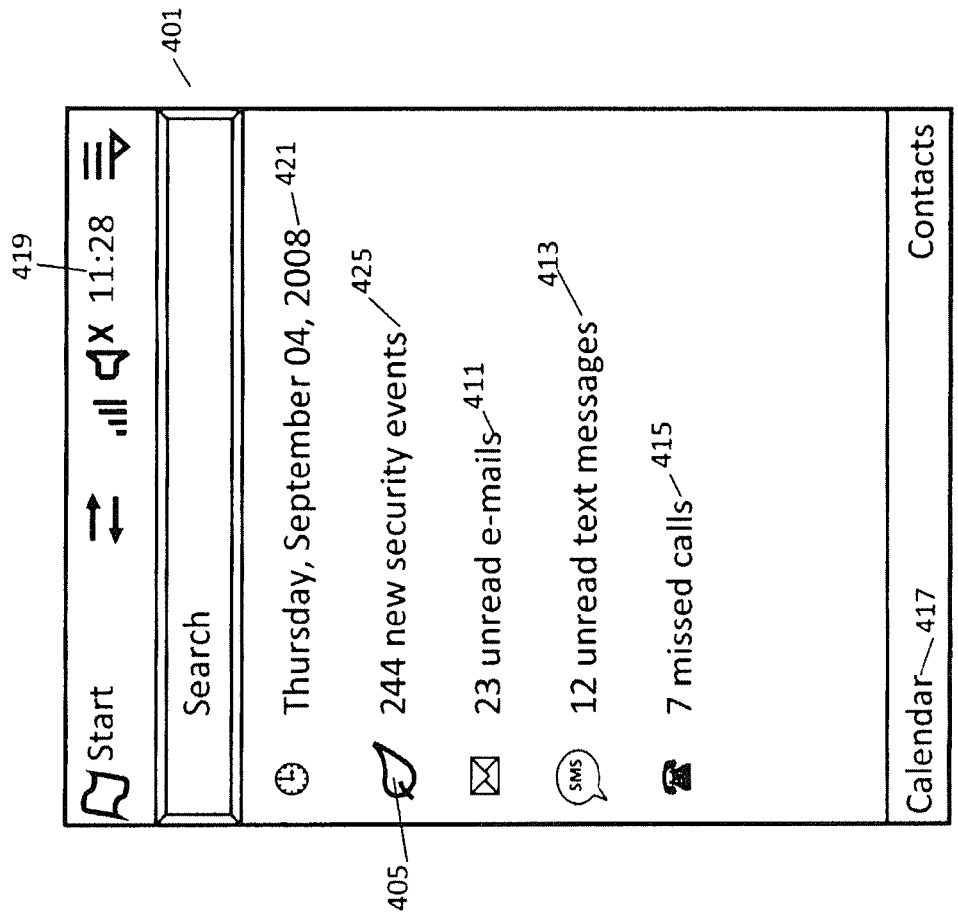
FIG. 5 is an exemplary home screen graphical user interface for the mobile device.

With reference to FIG. 5, mobile devices often have a home screen 401 that displays important information the user may want to see at-a-glance and is typically the default screen that a user can easily navigate to. Common information on such a screen includes the number of unread emails 411, the number of unread SMS messages 413, the number of missed calls 415, a calendar 417 with upcoming appointments, contacts

423, the current date 421 and time 419, and other frequently needed information. A home screen 401 may also be called a "today screen," a "desktop," or other term. In an embodiment, a portion of the home screen displays security-related information. The security-related information contains an icon 405 which graphically represents the current security status of the device and text which may contain the security state of the device or other information such as settings that need attention, the number of recent events 425, a description of a recent severe event, or actions that the user needs to perform in order to keep the device secure.

The icon 405 can be displayed in a dynamic manner that includes in the image an indication of the overall security status of the mobile device. For example, the color of the icon 405 can be a visual representation of the current security status. In an embodiment, a green icon may indicate that "everything is OK", a yellow icon may indicate a potential problem and a red icon may indicate that the device's security needs immediate attention. By activating the portion of the home screen displaying security information 405, 425, the user may be taken to an interface where they can perform needed actions or where they can view additional security-related information. This security screen allows the user to verify that their protection is working and immediately be notice if there are any security issues that may need attention. Because the home screen 401 is very often displayed, security information is pushed to the user in a perpetual display without the user having to request it. Such an embodiment may increase the user's attention to security and ability to react to security issues quickly.

Figure 6:
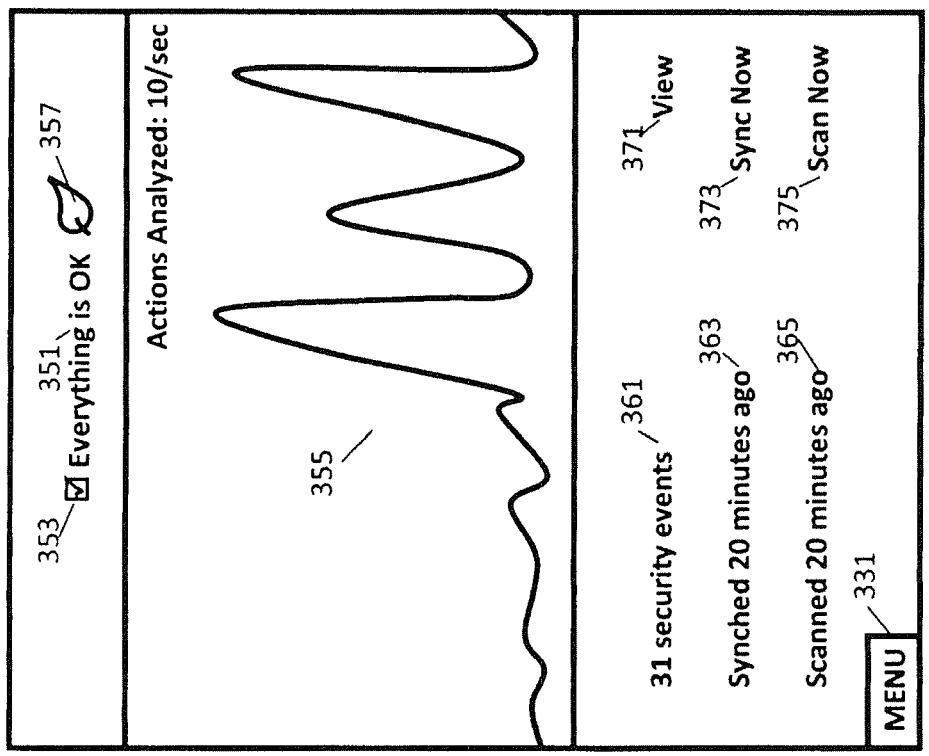
FIG. 6 is an exemplary security screen graphical user interface for the mobile device.

With reference to FIG. 6, an exemplary security screen 301 for a mobile device is illustrated. As discussed above, the security event information is communicated from the local or remote security component to the mobile device display. The status of the mobile device can represent an assessment of the overall security condition of the device. In this example, the status of the mobile device indicates that "Everything is OK" 351. This status can also be indicated by a status icon 357 which can be color coded as described above. If the device is in a non-secure state, the status would indicate that the device is "Infected with a virus" if there had been an un-remediated virus event or "Compromised" if there had been a successful exploitation. If the user had, for example, turned anti-virus protection off, the status would indicate a warning that the user needs to "Check settings". If there had been an internal error, the status would indicate "Error".

In an embodiment, the GUI includes an icon 353 located next to the text which also represents the overall status of the mobile device. The overall security status of the mobile device can be indicated by a color or type of icon 353 displayed. As discussed above, a green icon may indicate that everything is OK, a yellow icon may indicate a potential problem and a red icon may indicate a high severity security event. Similarly, the type of icon can indicate the status, such as a check mark indicating that everything is OK, a question mark may indicate a potential problem or an exclamation point indicating a known security problem. By activating the portion of the display surrounding the icon 353, a corresponding action screen can be displayed. For example, activating the portion of the display surrounding the icon 353 can cause the system to display details about the security settings of the mobile device.

In addition to the display of an overall security status for the mobile device, various other mobile device security data can be displayed on the GUI of the mobile device. In an embodiment, the information gathering component can also produce a security event chart 355 that is a graphical representation of the data being analyzed by the mobile device. The color of the graph may indicate the current security state of the device. For example, if the device is in a secure state, the graph would be green. If the device is in a warning state, the graph would be yellow. If the device is in an insecure state, the graph would be red. In an embodiment, the vertical axis of the chart 355 may represent the number of analysis actions performed by the mobile device and the horizontal axis may represent time. In this example, the graph scrolls left with the most recent data plotted on the right side and the older data on the left side. After a period of time has elapsed, the data is removed from the screen. The graph can be updated at regular time intervals such as every second. The vertical scale can be scaled for the largest number of detected events per time period. In an alternative embodiment, the chart 355 can represent the number of security events that have been detected over a given period of time.

Additional security information that can be displayed on the mobile device display includes: the total number of security events detected in a time period, the last time the mobile device has connected to or synchronized with a server, and the last time the mobile device was scanned for viruses, malware, and other security threats. In this example, 31 security events have been processed by the security system 361, the mobile device data was synchronized 20 minutes ago 363, and the mobile device was scanned 20 minutes ago 365. In an embodiment, clicking on any of these text displays will cause a corresponding action screen to be displayed.

The mobile device GUI can also include user controls that provide additional information to the users. By clicking on the "view" 371 control, the screen will display more information about the detected security events. Clicking the "sync now" 373 control causes the mobile device to synchronize the mobile device data stored locally with a remote back up copy of the data stored on the server. The "scan now" 375 control will allow the user to initiate a security scan of the mobile device. The system may also have controls that enable the user to set a desired format and layout for the security information output on the visual display 115.

While many of the controls are directly accessible from the main screen, the user may be able to access additional security controls by selecting the "menu" button 331. This can cause a pull down window of additional controls to be displayed. The pull down displays can include controls and information such as: view events, synchronize now, scan now, settings, about and exit. By clicking on the setting button, another pull down menu that lists system controls settings can be displayed. The user can then select the system controls and make any desired adjustments.

Many of the controls, such as scan and synchronize, can be performed automatically at time intervals set by the user, or at default time intervals. In an embodiment, the user can select the time interval and the time of day for performing these tasks. If a longer time period for software updates is selected such as once a week, the user can select the day of the week to perform this system maintenance. In an embodiment, the system also allows the user to select the communications mode preferences for the system maintenance such as only using a local area network or only using cellular networks while not roaming. Similar preference controls may be available for the other system controls. For example, the synchronization settings may allow the user to select the type of data to synchronize including: contacts, pictures, documents, call history, SMS messages, audio files and video files. The attack protection settings can allow the user to select the data paths that are protected including: cellular networks, Wi-Fi or other networks, Bluetooth, and short message service (SMS). The anti-spam settings can include blocking SMS and call spam based on pre-set or configurable criteria.

As described above, the mobile device and remote server can also be in direct or indirect communication with a remote client computer. In an embodiment, a widget can be installed on the client computer that allows the mobile device security status to be automatically transmitted from the server to the client computer and displayed in a persistent manner. The user or administrator responsible for a device or group of devices needs to enter authentication information to allow the widget to connect to the server and retrieve information. In this embodiment, the widget can persistently display status and security information corresponding to a device or group of devices in a manner similar to the persistent indicator displayed on the mobile device. For example, if an administrator's widget is configured to represent a group of devices, when all of the devices are in good security states, the widget will display that all of the devices are secure. In the secure state, the widget may display informational statistics such as the number of items backed up or the number of security events processed for the group. If the one or more devices are in a compromised or other insecure state, the widget will prominently display the devices that need attention to the administrator. If the widget indicates that one or more devices need attention, the administrator may click on portions of the widget to access additional security information pertaining to any of the devices that need attention.

In an embodiment, the security status widget corresponding to a single device or group of devices displays device information such as battery level, number of security events, recent data backed up, or other relevant data. The persistent indicator may also be embodied on an operating system tool bar as an icon representing the security state of a device or group of devices. As discussed above with reference to the security status icon in FIG. 5, the icon can have a dynamic aspect in that the color or display of the icon can be an indication of the overall security state of the mobile device. A green icon may indicate that everything is OK, a yellow icon may indicate a potential problem and a red icon may indicate a high severity security event. In an embodiment the type of icon can also indicate the status. For example, a check mark indicating that everything is OK or an exclamation point indicating a problem. The user can click on the icon to access additional security information for the mobile device. For example, the system can also provide a screen that displays other security event information for the mobile device in a graphical or text formats.

Additional security information can also be accessible through a web interface that can provide security information for a mobile device or group of mobile devices. In this embodiment, an administrator responsible for a device or group of devices can access the security status for one or more mobile devices on a single web interface. For example, an organization or family may have members who each have one or more mobile devices. In order to monitor the security status of all devices, the transport components on each of the mobile devices can be configured to transmit status and security information to a server. The server then processes the security information and displays the security status for each of the mobile devices on an administrator's computer that is in communication with the server. By displaying the security status of all mobile devices in the group, the administrator can quickly identify a device or devices that need attention.

In an embodiment, the administrator's computer is configured to remotely control each of the mobile devices. If a mobile device is deemed to be in a compromised, infected, or other bad security state, the administrator or user responsible will be informed and can take defensive actions to fix or investigate the device in order to protect other mobile devices, protect the data stored on the mobile device, and investigate the source of any attacks. For example, if a destructive virus is detected on a mobile device, the administrator can transmit a command to lockdown or reset the infected mobile device to prevent the virus from spreading. In an embodiment, the server may be configured to automatically take certain actions upon certain security information being received from the device. Additional details of the remote control of the mobile devices are disclosed in U.S. patent application Ser. No. 12/372,719, filed Feb. 17, 2009, "System And Method For Remotely Securing Or Recovering A Mobile Device."

Figure 7:
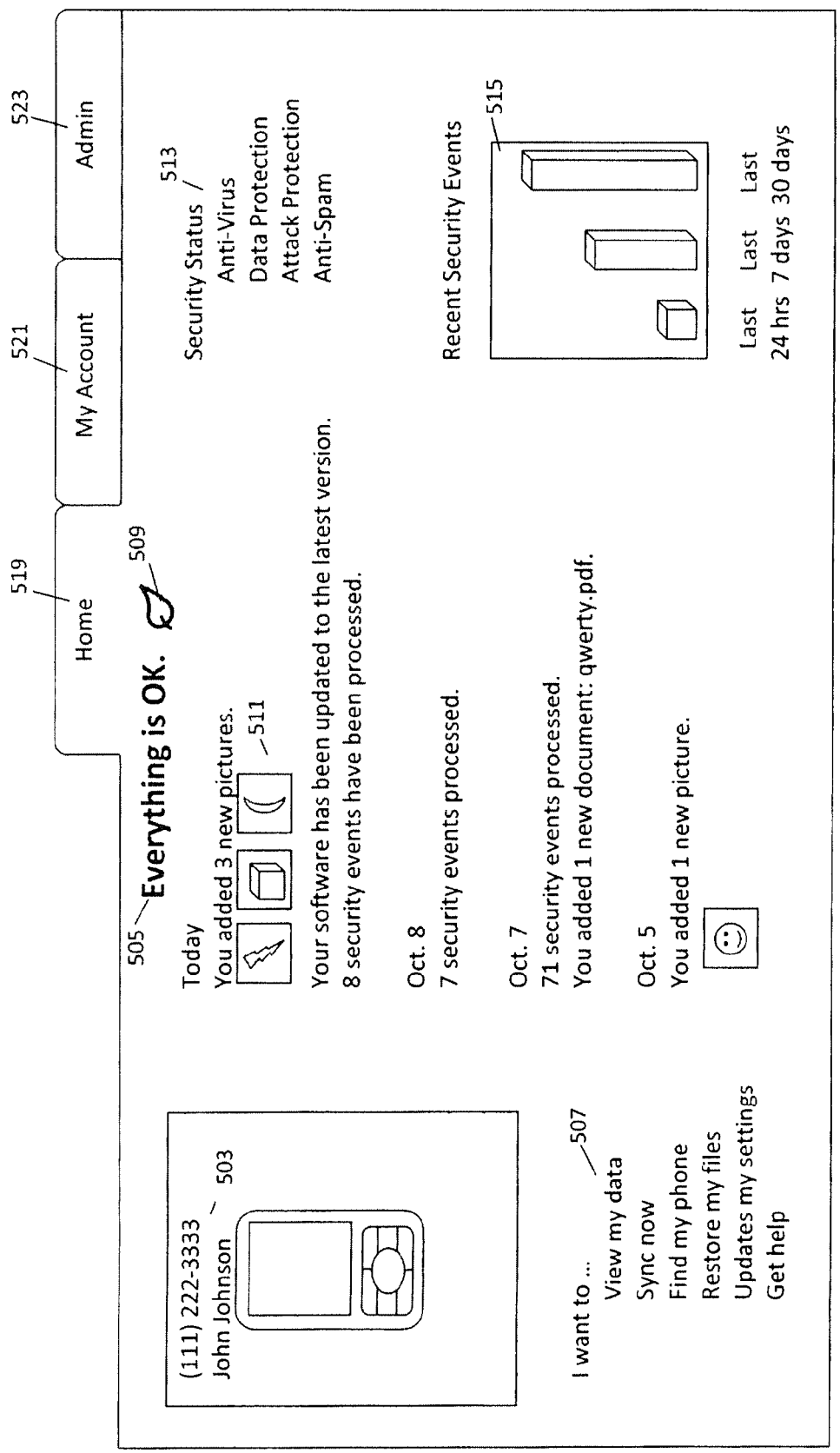
FIG. 7 is an exemplary web based mobile device security status display.

In other embodiments, a user can check the security status of one or more mobile devices through a security status web site. In order to access the web based status information for the mobile device, the user will log onto a web site by providing security information to verify access authorization. Security information can include identification and password protection or various other security screening methods. With reference to FIG. 7, an exemplary web based mobile device information page displayed on a client computer display is illustrated. Since there is typically more room on the client computer display than the mobile device display, the system can display additional information. In this example, the identification 503 and status text 505 and status icon 509 for the mobile device are provided on an upper center portion of the display and a listing of system controls 507 are placed in another area. Many of these controls are the same as the controls on the mobile device described, however these controls allow the client computer to remotely control the operation of the mobile device.

The web based display can also include additional security information about the mobile device such as backed-up data, software updates, and security events processed during the past few days 511. If any events merit user attention, those events may be specifically identified on the news feed 511. For example, if a device detected a virus or was found to be compromised by an attack, those events would be identified on the home screen. The display may identify the security status of each area of the security system including Anti-Virus, Data Protection, Attack Protection and Anti-Spam 513. The display may also include a graphical representation of the security events over the last day, week and month 515. In this example, the described display information is available on the "Home" tab 519. Various other control tabs can be available such as account 521 and administrative 523 pages which include associated controls and information. The illustrated display represents an example of a mobile device security status display. In an embodiment, the user can control the appearance of the web page through preference settings.

Figure 8:
FIG. 8 is an exemplary e-mail summary of the mobile device security status.

In another embodiment, the status of the mobile device can be transmitted to a client (other than the mobile device itself) through e-mail. An exemplary mobile device security status e-mail letter is illustrated in FIG. 8. The e-mail indicates that attack protection is disabled for the device 611, 14 security events have been handled by the system 615, a virus scan has been completed with no viruses found 617, and 1 SMS message has been received by the device 619. The e-mail also provides an identification of the mobile device. In this example, the phone number 621 identifies the mobile device. The quantity of data being protected 623 is also specified. The e-mail may include a link to the mobile device security status home page 625 which is illustrated in FIG. 6. In this embodiment, a current security status e-mail can be automatically sent based upon the user's preferences, such as daily and/or when a high severity security event is detected. The recipient or mobile device user may also be able to configure the information provided in the e-mail according to his or her personal preferences.

As critical infrastructure, mobile devices have a central role in the functioning of government, business, emergency response, and many other necessary functions of a country. Cyber-terrorism attacks on mobile devices or mobile infrastructures can result in disastrous service outages and the compromise of sensitive data. This system and method materially help defend mobile devices from cyber-terror attacks both by directly preventing attacks on devices and by allowing administrators responsible for mobile device deployments to recognize attacks as early as possible in order to put appropriate protective measures in place. Furthermore, this system and method enables administrators to quickly investigate the source and damage caused by cyber-terror attacks.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. A method comprising the steps of:
providing a local security component on a mobile device;
acquiring by the local security component data concerning a current configuration of the mobile device;
receiving at the local security component from one or more other applications running on the mobile device raw or partially processed data about events on the mobile device;
processing the received data by the local security component against a database containing identification data for security threats and against the current mobile device configuration data to assess a security state of the mobile device, the processing including assigning by the local security component a severity level for each event;
outputting by the local security component to the mobile device the security state assessment results, including a first assessed security state of the mobile device by the local security component for display of the current security state assessment on a mobile device display home screen;
transmitting the raw or partially processed data about events on the mobile device to a server for processing at the server;
receiving, at the mobile device, a second assessed security state of the mobile device from the server; and
displaying the second assessed security state on the mobile device display, wherein the second assessed security state by the server is different from the first assessed security state by the local security component.

2. The method of claim 1, wherein the outputting step further includes outputting the security state assessment results from the mobile device to a server.

3. The method of claim 1, wherein the outputting step further includes outputting the security state assessment results from the mobile device to a client computer for display on the client computer.

4. The method of claim 1, wherein the processing step further includes a severity assessment of security events on the mobile device to determine severity levels for the security events, and wherein the outputting step includes outputting the security severity level determination for display on the mobile device display home screen.

5. The method of claim 1, wherein the outputting step further includes outputting a list of security events for display on the mobile device display home screen.

6. The method of claim 1, wherein the outputting step further includes outputting a list of security events from the mobile device to a client computer for the display of the list of security events on the client computer.

7. The method of claim 1, wherein the outputting step further includes outputting a chart indicating security events on the mobile device for display of the security event chart on the mobile device display.

8. The method of claim 1, wherein the outputting step further includes outputting from the mobile device to a client computer a chart indicating security events on the mobile device for display of the security event chart on the client computer.

9. The method of claim 1, wherein the outputting step further includes outputting a status indicator signal representing a current security state assessment for the mobile device for display of the status indicator signal on the mobile device display home screen.

10. The method of claim 1, wherein the outputting step further includes outputting from the mobile device to a client computer a status indicator signal representing a current security state for the mobile device for display of the status indicator signal on the client computer.

11. The method of claim 1, wherein the outputting step further includes sending an e-mail to a client computer that includes a current security state assessment for the mobile device.

12. The method of claim 1, wherein the outputting step further includes generating a webpage that includes an indication of the current security state assessment for the mobile device.

13. The method of claim 1, wherein the assigning further comprises:
if a first event indicates malware was found and quarantined on the mobile device, assigning by the local security component a first severity level to the first event;
if the first event indicates malware was found and not quarantined on the mobile device, assigning by the local security component a second severity level to the first event; and
if the first event indicates no malware was found, assigning by the local security component a third severity level to the first event, wherein the third severity level is different from the first and second severity levels, and the first severity level is different from the second severity level.

14. The method of claim 1, wherein the assigning further comprises:
if a first event indicates blocking of spam, assigning by the local security component a first severity level to the first event.

15. The method of claim 1, wherein the assigning further comprises:
if a first event indicates a firewall rule violation, assigning by the local security component a first severity level to the first event.

16. The method of claim 1, further comprising the step of:
activating a portion of the display home screen to perform needed actions.

17. The method of claim 1, further comprising the step of:
activating a portion of the display home screen to view additional security related information.

18. A method comprising the steps of:
- providing a local security component on a mobile device;
- acquiring by the local security component data concerning a current configuration of the mobile device;
- receiving at the local security component from one or more other applications running on the mobile device raw or partially processed data about events on the mobile device;
- processing the received data by the local security component against a database containing identification data for security threats and against the current mobile device configuration data to assess a security state of the mobile device, the processing including assigning by the local security component a severity level for each event; and
- outputting by the local security component to the mobile device the security state assessment results for dynamic display of the current security state assessment on a portion of a mobile device display home screen.

19. The method of claim 18, wherein the outputting step further includes outputting the security state assessment results from the mobile device to a server.

20. The method of claim 18, wherein the outputting step further includes outputting the security state assessment results from the mobile device to a client computer for display on the client computer.

21. The method of claim 18, wherein the processing step further includes a severity assessment of security events on the mobile device to determine severity levels for the security events, and wherein the outputting step includes outputting the security severity level determination for display on the portion of the mobile device display home screen.

22. The method of claim 18, wherein the outputting step further includes outputting a list of security events for display on the portion of the mobile device display home screen.

23. The method of claim 18, wherein the outputting step further includes outputting a list of security events from the mobile device to a client computer for the display of the list of security events on the client computer.

24. The method of claim 18, wherein the outputting step further includes outputting a chart indicating security events on the mobile device for display of the security event chart on the portion of the mobile device display.

25. The method of claim 18, wherein the outputting step further includes outputting from the mobile device to a client computer a chart indicating security events on the portion of the mobile device for display of the security event chart on the client computer.

26. The method of claim 18, wherein the outputting step further includes outputting a status indicator signal representing a current security state assessment for the mobile device for dynamic display of the status indicator signal on the portion of the mobile device display home screen.

27. The method of claim 18, wherein the outputting step further includes outputting from the mobile device to a client computer a status indicator signal representing a current security state for the mobile device for display of the status indicator signal on the client computer.

28. The method of claim 18, wherein the outputting step further includes sending an e-mail to a client computer that includes a current security state assessment for the mobile device.

29. The method of claim 18, wherein the outputting step further includes generating a webpage that includes an indication of the current security state assessment for the mobile device.

30. The method of claim 18, wherein the displayed security state assessment results include a first assessed security state of the mobile device by the local security component, and the method further comprises:
- transmitting the raw or partially processed data about events on the mobile device to a server for processing at the server;
- receiving, at the mobile device, a second assessed security state of the mobile device from the server; and
- displaying the second assessed security state on the portion of the mobile device display, wherein the second assessed security state by the server is different from the first assessed security state by the local security component.

31. The method of claim 18 wherein the assigning further comprises:
- if a first event indicates malware was found and quarantined on the mobile device, assigning by the local security component a first severity level to the first event;
- if the first event indicates malware was found and not quarantined on the mobile device, assigning by the local security component a second severity level to the first event; and
- if the first event indicates no malware was found, assigning by the local security component a third severity level to the first event, wherein the third severity level is different from the first and second severity levels, and the first severity level is different from the second severity level.

32. The method of claim 18 wherein the assigning further comprises:
- if a first event indicates blocking of spam, assigning by the local security component a first severity level to the first event.

33. The method of claim 18 wherein the assigning further comprises:
- if a first event indicates a firewall rule violation, assigning by the local security component a first severity level to the first event.

34. The method of claim 18, further comprising the step of:
- activating the portion of the display home screen to perform needed actions.

35. The method of claim 18, further comprising the step of:
- activating the portion of the display home screen to view additional security related information.

* * * * *